(12) United States Patent
Kawanishi et al.

(10) Patent No.: US 7,236,661 B2
(45) Date of Patent: Jun. 26, 2007

(54) TUNABLE DISPERSION COMPENSATION APPARATUS

(75) Inventors: Tetsuya Kawanishi, Koganei (JP); Masayuki Izutsu, Koganei (JP); Sze Yun Set, Kawaguchi (JP); Mark Kenneth Jablonski, Kawaguchi (JP); Yuuichi Tanaka, Kawaguchi (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 0 days.

(21) Appl. No.: 11/091,765

(22) Filed: Mar. 29, 2005

(65) Prior Publication Data

US 2005/0226554 A1 Oct. 13, 2005

(30) Foreign Application Priority Data

Mar. 29, 2004 (JP) ............................. 2004-095742

(51) Int. Cl.
*G02B 6/26* (2006.01)
*H04B 10/00* (2006.01)

(52) U.S. Cl. ...................................... 385/27; 398/159

(58) Field of Classification Search ................. 385/27, 385/37; 398/81, 147 U, 147
See application file for complete search history.

(56) References Cited

U.S. PATENT DOCUMENTS 6,522,795 B1 * 2/2003 Jordan et al. ................. 385/10
6,987,904 B2 * 1/2006 Kawanishi et al. ........... 385/27
2005/0147415 A1 * 7/2005 Fee et al. .................... 398/159

FOREIGN PATENT DOCUMENTS

JP 2001-209082 8/2001

OTHER PUBLICATIONS

Sadayuki Matsumoto, et al., "Tunable dispersion equalizer with a divided thin film heater", Optical Fiber Communication Conference and Exhibit, Technical Digest Series, Conference Edition, Mar. 20, 2001, pp. TuS4-1 to TuS4-3.

* cited by examiner

Primary Examiner—Sung Pak
Assistant Examiner—Tina M. Wong
(74) Attorney, Agent, or Firm—Oblon, Spivak, McClelland, Maier & Neustadt, P.C.

(57) ABSTRACT

This invention is a tunable dispersion compensation apparatus that suppresses the effects of the transmission channel dispersion which impedes transmission when optical signals used in high-speed communications are transmitted across long distances among various points. It is an apparatus that performs dispersion compensation upon received optical signals based on information that accompanies the received optical signals, or an apparatus that performs dispersion compensation in advance upon optical signals to be sent based on information related to the destination of the optical signals to be sent, including: an input block and output block for optical signals, with a dispersion element that has wavelength dispersion characteristics and a wavelength shifter that is able to adjust the amount of shift depending on the input optical signal provided in a circulating light path upon the light path from the input block to the output block, and further including a constitution whereby the input optical signal circulates around a circulating light path containing the dispersion element and wavelength shifter a stipulated number of times before reaching the output block, and a constitution whereby the number of times the light circulates is determined based on the information and input to the wavelength shifter.

16 Claims, 10 Drawing Sheets

TUNABLE DISPERSION COMPENSATION APPARATUS

BACKGROUND OF THE INVENTION

1. Field of the Invention

This invention relates to a tunable dispersion compensation apparatus that suppresses the effects of the transmission channel dispersion which impedes transmission when optical signals used in high-speed communications are transmitted across long distances among various points.

2. Description of the Prior Art

In data communications systems for the Internet and mobile telephones, packet-switched systems are used instead of the circuit-switched systems used in conventional fixed voice telephony. In packet-switched systems, it is necessary to adjust the timing of the large numbers of packets arriving at a switch so that they do not collide with each other, and transmit the packet signals to their respective destinations. In the case of high-speed systems that use optical fiber for transmission in particular, in existing packet-switched systems, the optical signals are first converted to electrical signals and stored in semiconductor memory devices. The appropriate optical fiber is selected depending on the destination, and the signals are converted from electrical signals back to optical signals and transmitted at the desired timing. However with this method, the operating speed of the portions that process electrical signals is limited, so there is a problem in that the high capacity, high-speed advantages of optical signals cannot be fully exploited.

In contrast, attempts have been made to achieve control over the timing and destination of optical signals as is. Random access memory that is able to store optical signals at high speed has yet to be achieved as of now, so the method used is to control timing by switching among delay lines that use large numbers of optical fibers of different lengths (taking advantage of the time lag when light passes through the fiber), thus constituting a buffer memory. With this method, control can be achieved without converting optical signals into electrical signals, so ultra-high-speed optical transmission of several gigabits per second or more can be handled. However, there are drawbacks in that optical amplifiers are required to compensate for the losses in delay lines that use large numbers of optical fibers, and the structure becomes complicated.

In regard to this, JP-A 2001-209082 discloses a tunable optical delay apparatus that has a wavelength conversion apparatus and optical amplifier for compensating for loss within a single optical fiber loop, and is provided with a band-limited type optical input/output port for taking light out of and into the loop. The band-limited type optical input/output port consists of a band-limited optical filter sandwiched between two circulators. The band-limited optical filter is made of a fiber Bragg grating (FBG). The input light enters the fiber loop through an optical port and circulates. The optical signal, with its wavelength converted by an optical single-sideband (SSB) modulator, circulates around the loop while its wavelength is shifted each lap until it is extracted when the wavelength falls outside the reflection band of the optical input/output post.

In addition, with the tunable optical delay apparatus disclosed in JP-A 2001-209082, the characteristics of the FBG of the input/output port have a major effect on the overall tunable optical delay. Light within the reflection band is reflected by the FBG and returned to the loop, but the FBG has dispersion characteristics, so the delay time when light is reflected may vary greatly depending on the wavelength of light.

When long-distance, high-speed transmission is performed, waveform deterioration typically occurs due to the effect of dispersion within the optical fiber. The effect of dispersion within the fiber fluctuates with disturbance, so the development of compensating technology able to deal with it is proceeding. Moreover, each optical signal in a packet-switched system originate in a various source point, so the propagation distance of each is not necessarily the same and thus it is necessary to vary the amount of compensation for dispersion for each optical signal.

An object of this invention is to provide a tunable dispersion compensation apparatus that has a wide range of variability and is capable of a large amount of compensation.

Another object of this invention is to provide a tunable dispersion compensation apparatus that suppresses the effects of the wavelength dispersion characteristics of a transmission channel by compensating for the wavelength dispersion of the transmission channel prior to the transmission of an optical signal, or by compensating after the optical signal is received.

SUMMARY OF THE INVENTION

This invention provides a tunable dispersion compensation apparatus comprising a light path from an input block to an output block for optical signals, a circulating light path upon the light path, a dispersion element that has wavelength dispersion characteristics, and a wavelength shifter that is able to adjust an amount of shift depending on an input optical signal, the dispersion element and wavelength shifter being provided in the circulating light path, wherein the input optical signal circulates around the circulating light path containing the dispersion element and wavelength shifter a stipulated number of times before reaching the output block.

This invention also provides a tunable dispersion compensation apparatus that performs dispersion compensation upon received optical signals based on information that accompanies the received optical signals, comprising a light path from an input block to an output block for optical signals, a circulating light path upon the light path, a dispersion element that has wavelength dispersion characteristics, a wavelength shifter that is able to adjust an amount of shift depending on an input optical signal, the dispersion element and wavelength shifter being provided in the circulating light path, a constitution whereby the input optical signal circulates around the circulating light path containing the dispersion element and wavelength shifter a stipulated number of times before reaching the output block, and a constitution whereby the number of times the input optical signal circulates is determined based on the information and input to the wavelength shifter.

This invention also provides a tunable dispersion compensation apparatus that performs dispersion compensation in advance upon optical signals to be sent based on information related to a destination of the optical signals to be sent, comprising: a light path from an input block to an output block for optical signals, a circulating light path upon the light path, a dispersion element that has wavelength dispersion characteristics, a wavelength shifter that is able to adjust an amount of shift depending on an input optical signal, the dispersion element and wavelength shifter being provided in the circulating light path, a constitution whereby the input optical signal circulates around the circulating light path containing the dispersion element and wavelength shifter a stipulated number of times before reaching the output block, and a constitution whereby the number of times the input optical signal circulates is determined based on the information and input to the wavelength shifter.

In any one of the first to third mentioned tunable dispersion compensation apparatus, the number of times the input optical signal circulates around the circulating light path containing the dispersion element and wavelength shifter is determined by adjusting the amount of shift determined based on the information.

In any one of the first to third mentioned tunable dispersion compensation apparatus, the dispersion characteristics of the dispersion element are tunable by operation from outside, and dispersion applied to the optical signal can be varied by adjusting the dispersion characteristics of the dispersion element.

In any one of the first to fifth mentioned tunable dispersion compensation apparatus, the optical path is provided with a first circulator and a second circulator, the circulating light path is a loop-shaped path connecting the second circulator and wavelength shifter, the optical signal input to the light path from the input block to the output block passes through the first circulator and dispersion element, circulates around the loop-shaped light path, and passes though the dispersion element and first circulator in the light path until reaching the output block, and the dispersion element is a dispersion element having a reflection band intermediate between a wavelength of the input optical signal and a wavelength of the optical signal reaching the output block.

In any one of the first to fifth mentioned tunable dispersion compensation apparatus, the optical path is provided with a first circulator, a second circulator and a reflection element, the circulating fight path is a loop-shaped light path containing the second circulator, wavelength shifter and dispersion element, the optical signal input to the light path from the input block to the output block passes through the first circulator and reflection element, circulates around the loop-shaped light path, and passes through the reflection element and first circulator in the light path until reaching the output block, and wherein the reflection element is a reflection element having a reflection band intermediate between a wavelength of the input optical signal and a wavelength of the optical signal reaching the output block.

This invention further provides a tunable dispersion compensation apparatus comprising a light path from an input block to an output block for light and a circulating light path containing first filter means, a first circulator, a second circulator, second filter means, a wavelength shifter and a tunable dispersion element, where an input optical signal passes through the circulating light path before reaching the output block, the first filter means transmitting the input optical signal but reflecting frequency-shifted light, the second filter means transmitting optical signals that have reached the output block after having been frequency-shifted while circulating a predetermined number of times, but reflecting optical signals that have not reached that number of times, and the optical signals that circulate around the circulating light path being given wavelength dispersion by the tunable dispersion element and then output from the second filter means.

This invention further provides a tunable dispersion compensation apparatus comprising a light path from an input block to an output block for light and a circulating light path containing a first circulator, first reflection means, a tunable dispersion element, a wavelength shifter, a second circulator and second reflection means, where an input optical signal passes through the circulating light path before reaching the output block, the first reflection means reflecting the input optical signal but transmitting frequency-shifted light, the second reflection means reflecting optical signals that have reached the output block after having been frequency-shifted while circulating a predetermined number of times, but transmitting optical signals that have not reached that number of times, and the optical signals that circulate around the circulating light path being given wavelength dispersion by the tunable dispersion element and then output from the second circulator.

With the tunable dispersion compensation apparatus according to this invention, when optical signals used in high-speed communications are transmitted across long distances among various points, it is possible to suppress the effects of the transmission channel dispersion which impedes transmission based on information about the intervals among those various points, thus permitting even higher-speed optical communications.

In addition, with the tunable dispersion compensation apparatus according to this invention, by utilizing the effect of the dispersion arising in the FBG, making the FBG tunable and changing the number of laps of circulation by means of an optical SSB modulator, the range of variability is made wider and the amount of compensation is increased.

DESCRIPTION OF THE PREFERRED EMBODIMENTS

Here follows a detailed description of preferred embodiments of the tunable dispersion compensation apparatus according to this invention made with reference to the accompanying drawings. In the following description, apparatus having the same or similar function will be given the same symbols and their explanation will not be repeated absent a special reason to do so.

Figure 1:
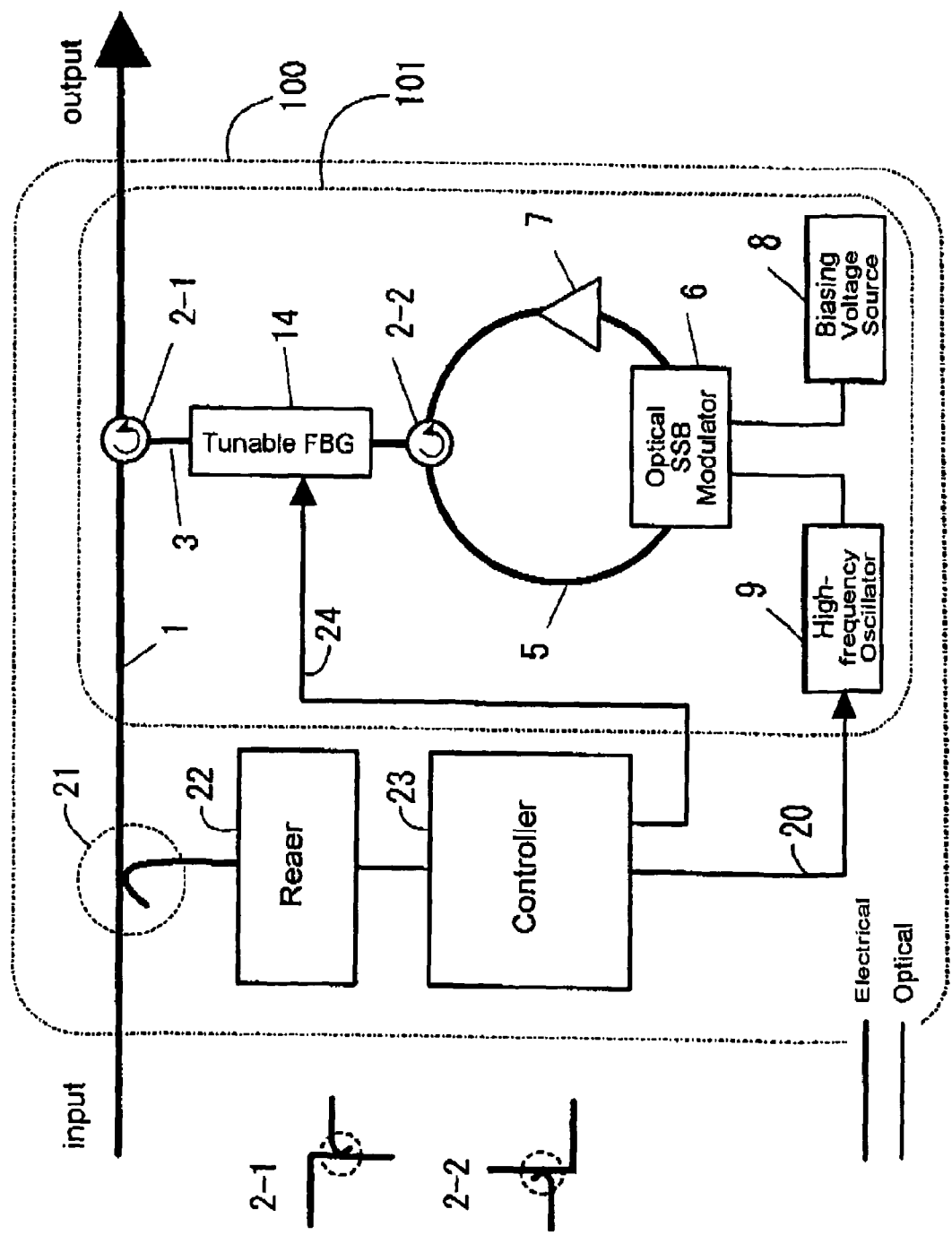
FIG. 1 is a block diagram used to illustrate Embodiment 1 of a tunable dispersion compensation apparatus according to the present invention.

FIG. 1 is a block diagram illustrating, as Embodiment 1 of the invention, a tunable dispersion compensation apparatus 100 that compensates after receiving signals. This is an apparatus that performs dispersion compensation on received optical signals based on information that accompanies the received optical signal, being provided with an input block and output block for the received optical signal. In addition a dispersion compensation block 101 is provided between the input and output blocks, and the compensation of wavelength dispersion is performed here. The operation of this dispersion compensation block 101 can be replaced with that of the dispersion compensation block 201 to be described later.

In the dispersion compensation block 101, a dispersion element that has wavelength dispersion characteristics, consisting of tunable FBG 14, and a wavelength shifter that is able to adjust the amount of shift depending on the input optical signal, consisting of an optical SSB modulator 6, are provided upon the light path from the input block to the output block. The amount of this shift is adjusted by increasing or decreasing the modulation frequency. The input optical signal passes through a circulator 2-1, tunable FBG 14 and circulator 2-2, is introduced into a light path containing the dispersion element (tunable FBG 14) and wavelength shifter (optical SSB modulator 6) described above, circulates around this light path until reaching the output block described above where it is output. Here, the reflection characteristics of the tunable FBG 14 are such that it transmits the input signal ($\lambda_{in}$) and output signal ($\lambda_{out}$) but reflects optical signals that have an intermediate amount of wavelength shift. The dispersion element may be any that is able to vary the wavelength dispersion characteristics of the tunable FBG 14 while satisfying these conditions. In the present invention as described above, alternately, in the case of a frequency relationship wherein the input signal ($\lambda_{in}$) and output signal ($\lambda_{out}$) are interchanged, the increase or decrease in the frequency shift are reversed.

With the present invention, a tunable FBG wherein its transmission characteristics or reflection characteristics can be changed from outside is used, and a description of such an element is given in S. Matsumoto, et. al., "Tunable dispersion equalizer with a divided thin film heater," Optical Fiber Communication Conference and Exhibit, Technical Digest Series, Conference Edition, TuS4-1 to TuS4-3, Mar. 20, 2001, for example.

At this time, a reader 22 is used to read labels in the optical packet signals or other information that accompanies the received optical signals. The optical signal read by this reader is a signal that has yet to undergo dispersion compensation, so it is preferable for the data transmission rate to be set low in this portion. The additional information read by the reader 22, particularly information that indicates the point of origin of that optical signal, is sent to a controller. The controller performs a lookup on the point of origin in a database prepared in advance to find the wavelength dispersion compensation value corresponding to that point of origin, compares this against the characteristics set for the tunable FBG and determines the number of times the optical signal should circulate around the light path 5, and determines the frequency of oscillation of a high-frequency oscillator 9 from this value. In addition, the tunable FBG can have its reflection band or wavelength dispersion characteristics varied. In order to perform the required dispersion compensation on the input optical signal, it is preferable to adjust the frequency of oscillation of the high-frequency oscillator 9 and the reflection band or wavelength dispersion characteristics of the tunable FBG.

Figure 2:
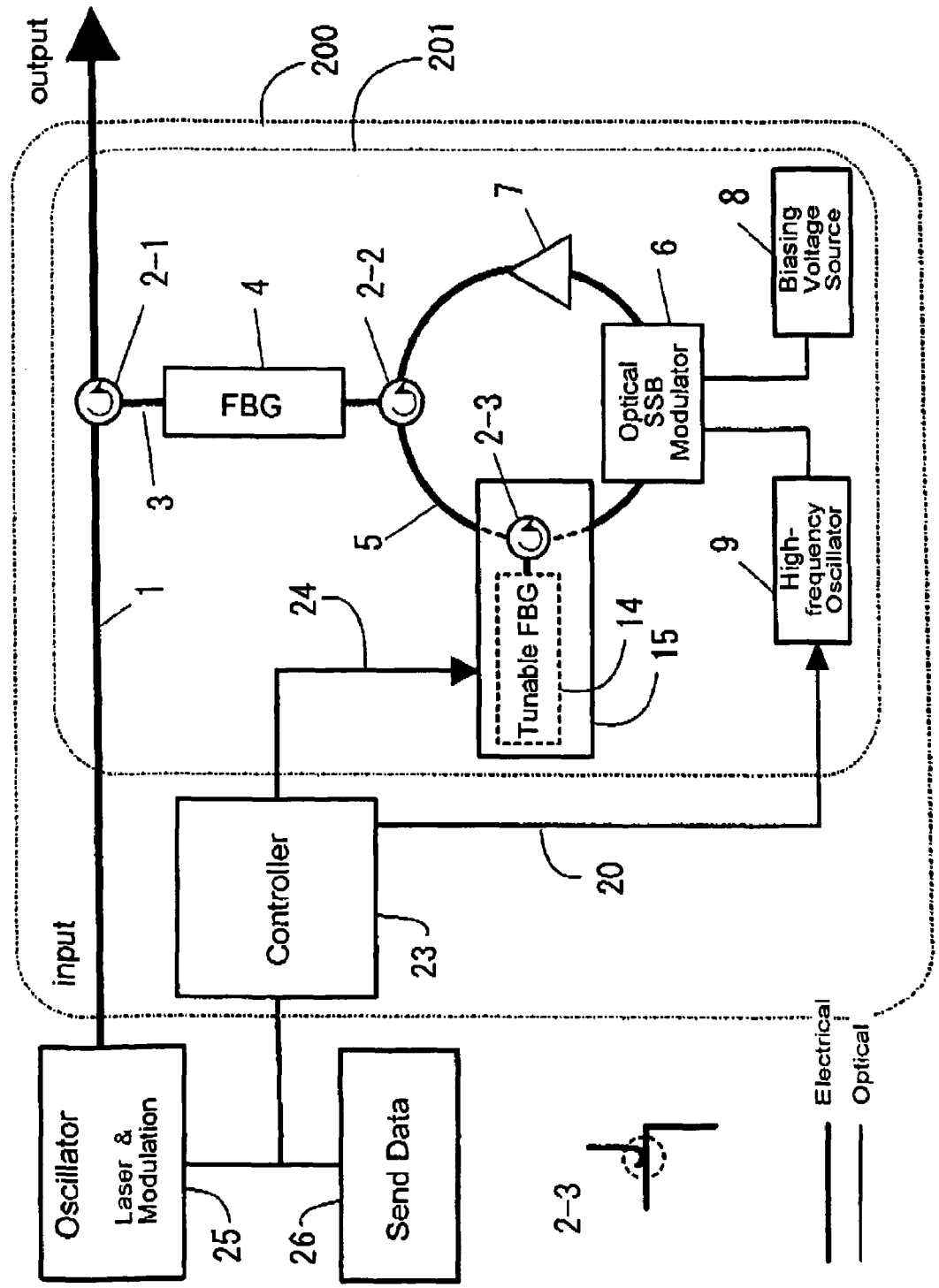
FIG. 2 is a block diagram used to illustrate Embodiment 2 of a tunable dispersion compensation apparatus according to the present invention.

In addition, FIG. 2 is a block diagram illustrating, as Embodiment 2 of the present invention, a tunable dispersion compensation apparatus 200 that compensates for the wavelength dispersion of the transmission channel prior to the transmission of an optical signal. This is an apparatus that performs dispersion compensation in advance on optical signals to be sent based on address information in the optical signal to be sent, being provided with an input block and output block for the optical signal to undergo dispersion compensation in advance. In addition, a dispersion compensation block 201 is provided between the input and output blocks, and the compensation of wavelength dispersion is performed here. The operation of this dispersion compensation block 201 can be replaced with that of the dispersion compensation block 101 described above. In addition a transmission-type tunable dispersion element is used as the tunable dispersion element 15, but one using a circulator 2-3 and reflection-type tunable FBG 14 as shown in FIG. 2 may also be used. The transmission-type tunable dispersion element may also be constituted using an FBG.

Figure 3:
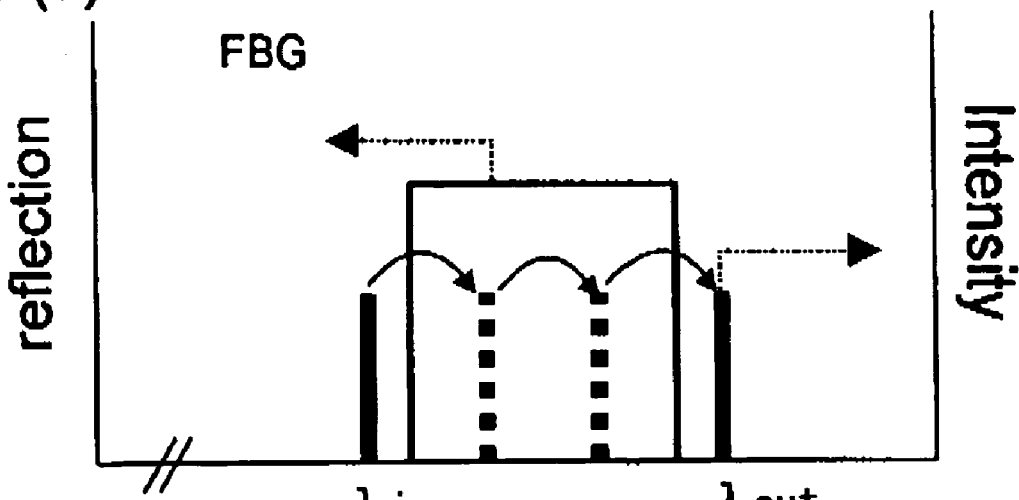
FIG. 3(a) illustrates the reflection characteristics of an FBG.
FIG. 3(b) illustrates the reflection characteristics of a tunable FBG.
FIG. 3(c) illustrates the reflection characteristics of another tunable FBG.
Figure 3:
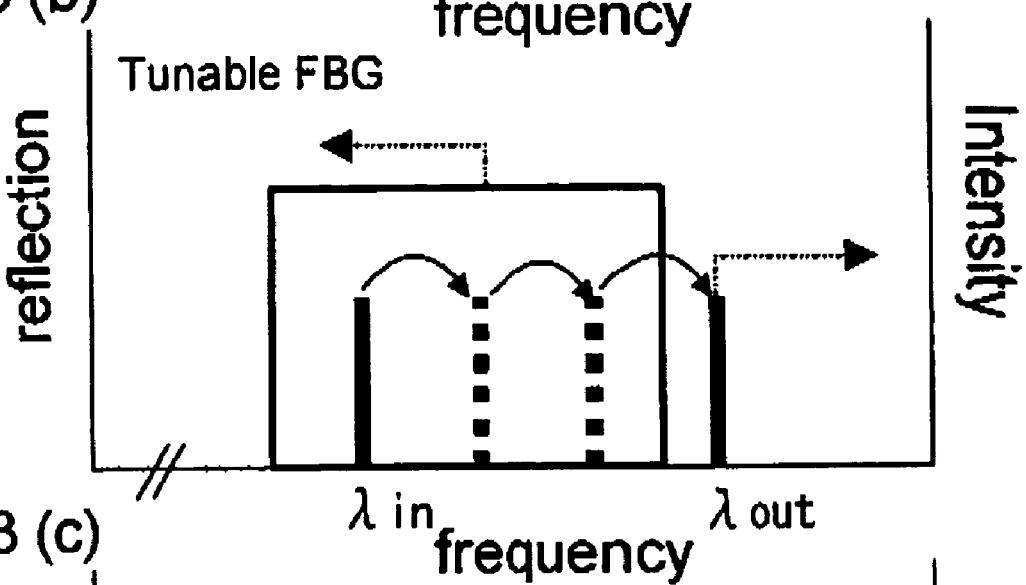
Figure 3:
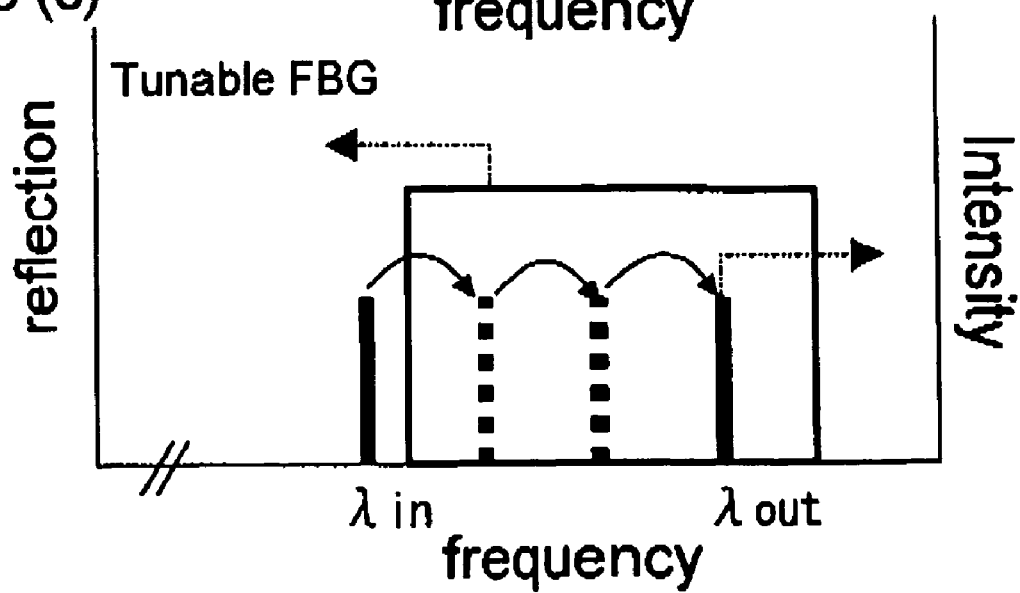

In the dispersion compensation block 201, the input optical signal passes through a circulator 2-1, FBG 4 and circulator 2-2, is introduced into a light path containing the dispersion element and wavelength shifter described above, circulates around this light path until reaching the output block described above where it is output. Here, the reflection characteristics of the FBG 4 are illustrated in FIG. 3(a), it being one element that determines the number of times that the optical signal will circulate around the above light path. The input signal ($\lambda_{in}$) and output signal ($\lambda_{out}$) are to be transmitted, but optical signals that have an intermediate amount of wavelength shift must be reflected. In the case of a frequency relationship wherein the input signal ($\lambda_{in}$) and output signal ($\lambda_{out}$) are interchanged, the increase or decrease in the frequency shift are opposite. In addition, the optical signal circulating around the light path 5 has its wavelength dispersion compensated using the dispersion characteristics of the tunable FBG 14, a wavelength shift is performed with the optical SSB modulator 6 and is amplified by an amplifier 7, if necessary. The amplified optical signal passes through the circulator 2-2 and reaches the FBG 4, but if it has not reached a frequency that can be transmitted by the FBG 4, it will again circulate around the light path 5. Once it has reached a frequency that can be transmitted by the FBG 4, it passes through circulator 2-1 and is output.

Here, the reflection characteristics of the FBG 4 must be such that, as shown in FIG. 3(a), optical signals that are intermediate between the input signal ($\lambda_{in}$) to the FPG 4 and the output signal ($\lambda_{out}$) from the FBG 4 must be reflected. In addition, if provided such that an optical signal passes through it before the optical SSB modulator 6 as shown in FIG. 2, the tunable FBG 14 must have reflection characteristics as shown in FIG. 3(b) such that it reflects at least signals from the input signal ($\lambda_{in}$) to the FBG 4 up until immediately before the output signal ($\lambda_{out}$) with respect to the wavelength shift. The characteristics may also be such that the output signal ($\lambda_{out}$) is reflected. If it is provided such that an optical signal passes through it after the optical SSB modulator 6, then it must have reflection characteristics as shown in FIG. 3(c) such that it reflects at least signals from immediately after the input signal ($\lambda_{in}$) to the FBG 4 up until the output signal ($\lambda_{out}$) with respect to the wavelength shift. The characteristics may also be such that the input signal ($\lambda_{in}$) is reflected.

Here, the FBG for use in a tunable dispersion compensator reported in the aforementioned paper, for example, can be used as the tunable FBG 14. However, those that are applicable to the present invention are not limited to this FBG but rather it is clear that it is sufficient for them to have wavelength dispersion characeristics that are controllable from outside and the reflection characteristics described above.

In order to perform dispersion compensation on an optical signal to be sent in advance based on address information for the optical signal to be sent, the send data 26 supplied to the oscillator 25 that performs laser oscillation and light modulation is also supplied to the controller. The controller uses data prepared in advance to find the dispersion value to be compensated corresponding to the destination information, and determines the frequency of the modulation signal required to be supplied to the optical SSB modulator to achieve this compensation. This modulation signal is either sine wave or cosine wave. In addition, the settings of the tunable FBG determine the dispersion value that the optical signal undergoes each lap of circulation. In the operation of this device, it is preferable to select the optimal combination of the number of laps of circulation and the dispersion value.

Figure 4:
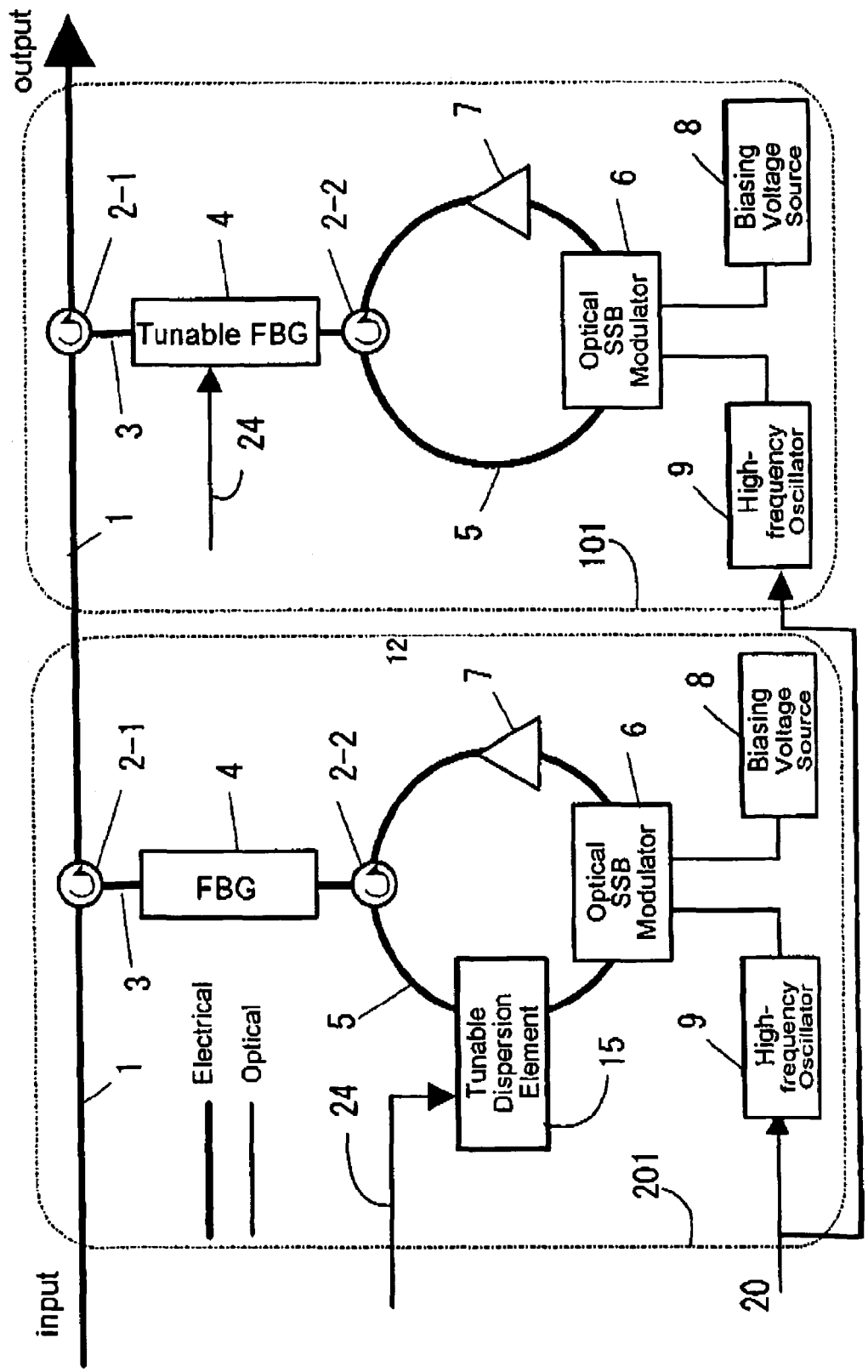
FIG. 4 shows Embodiment 3 of a tunable dispersion compensation apparatus according to the present invention, with a block diagram illustrating an example of the constitution of a tunable dispersion compensation apparatus wherein the dispersion compensation block is divided into two.

Embodiment 3 will be described. With the tunable dispersion compensation apparatus shown in FIG. 1 or FIG. 2, the frequency of the output optical signal is shifted from that at the time of input. There are cases in which such frequency shifts are preferably as small as possible. In the constitution shown in FIG. 4, the dispersion compensation block is divided in two, giving a constitution wherein the frequency shifts cancel each other out. Here, a tunable FBG is provided in each of the dispersion compensation blocks, but it may be provided in only one. In addition, the frequencies of the modulation signals applied to each of the optical SSB modulators need not necessarily be the same.

Figure 5:
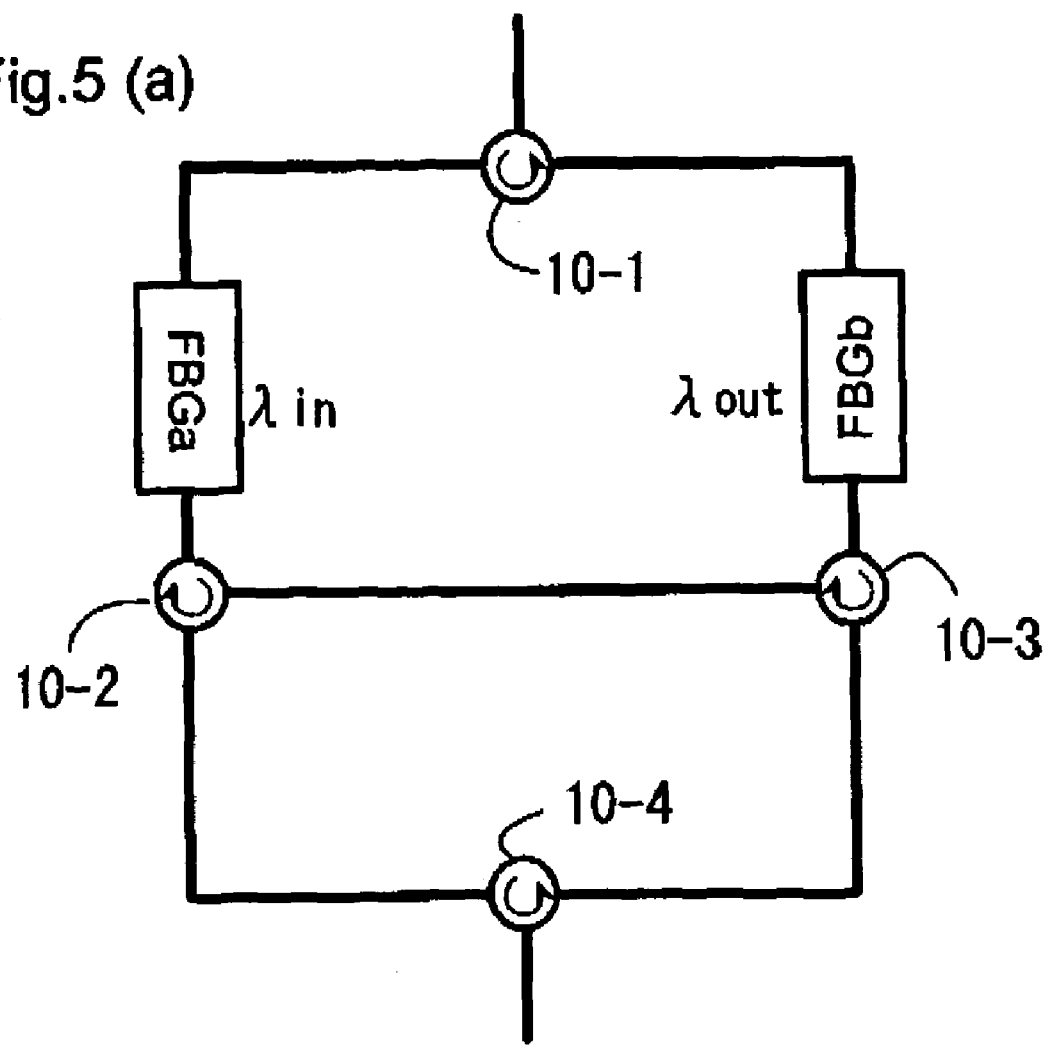
FIG. 5(a) is a block diagram illustrating an example wherein the dispersion compensation block consists of an optical filter using a pair of FBGs.
FIG. 5(b) illustrates the reflection characteristics of the apparatus of FIG. 5(a).
Figure 5:
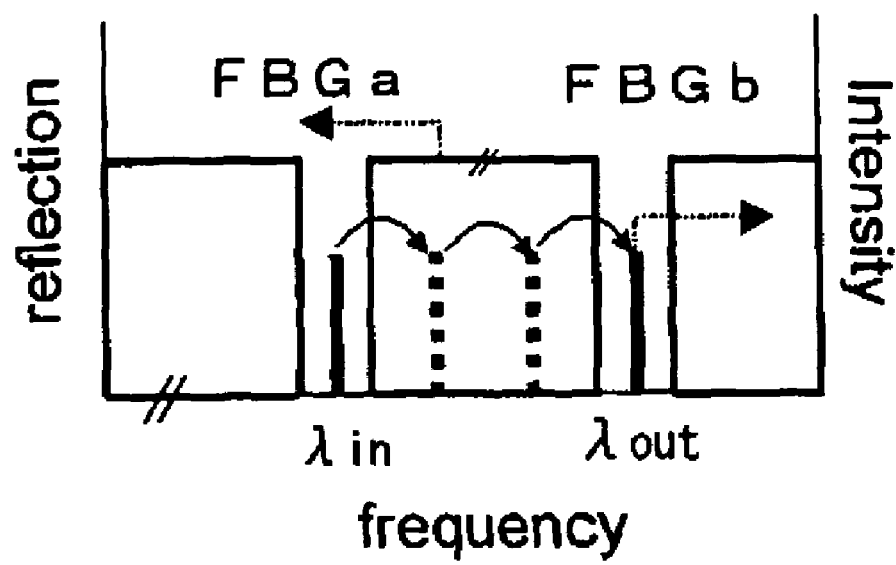
Figure 6:
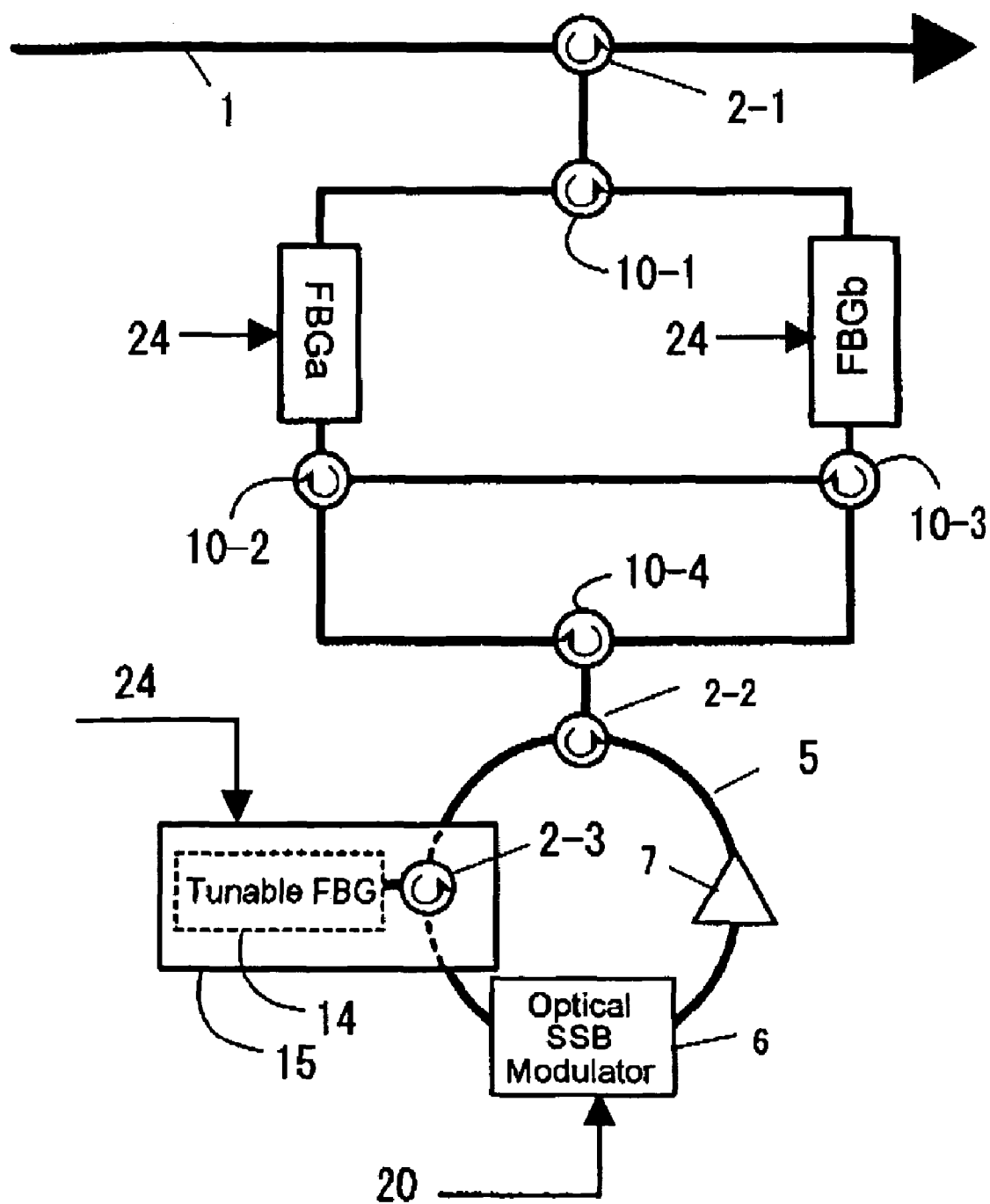
FIG. 6 is a block diagram illustrating an example wherein the dispersion compensation block consists of the optical circuit of FIG. 5(a).

With the tunable dispersion compensation apparatus of FIG. 1 or FIG. 2 above, one tunable FBG is used for dispersion compensation, but a pair of tunable FBGs may also be used instead. The optical circuit shown in FIG. 5(a) is an example wherein the dispersion compensation block consists of an optical filter using a pair of FBGs having a narrow transmission band. As shown in FIG. 5(b), the characteristics of tunable filter FBGa are such that the input signal ($\lambda_{in}$) is transmitted but all other signals are reflected. In addition, the characteristics of tunable filter FBGb are such that the output signal ($\lambda_{out}$) is transmitted but all other signals are reflected. By using such an optical filter to construct the optical circuit of FIG. 5(a), functions similar to those of tunable FBG 14 of FIG. 1 can be achieved. FIG. 6 is equivalent to the dispersion compensation block 101 or 201 constructed using the optical circuit of FIG. 5(a), so in order to make it function like the dispersion compensation block of FIG. 1, the FBGa or FBGb is controlled by control signals 24. In this case, the tunable FBG 14 is not used. In addition, in order to make the constitution of FIG. 6 function like the dispersion compensation block of FIG. 2, the tunable FBG 14 rather than FBGa or FBGb is controlled by control signals 24.

Figure 7:
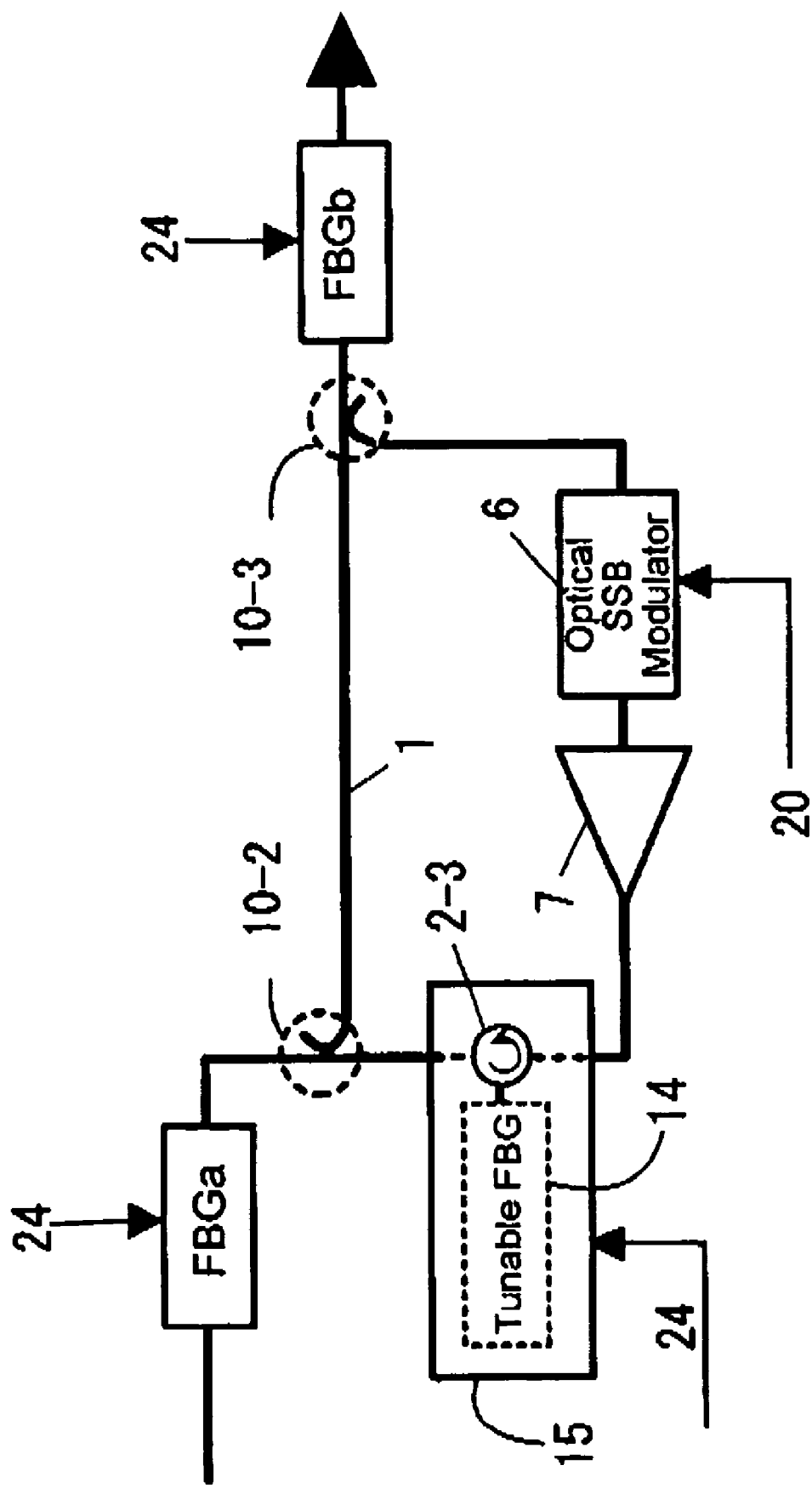
FIG. 7 illustrates a simplified embodiment of the optical circuit of FIG. 6.

However, in the constitution of FIG. 6, the use of circulators is redundant, so eliminating this waste gives the constitution of FIG. 7. In order to make this function like the constitution of FIG. 1, the FBGa or FBGb is controlled with control signals 24. In this case, the tunable FBG 14 is not used. In addition, in order to make the constitution of FIG. 7 function like the constitution of FIG. 2, the tunable FBG 14 rather than FBGa or FBGb is controlled by control signals 24.

Figure 8:
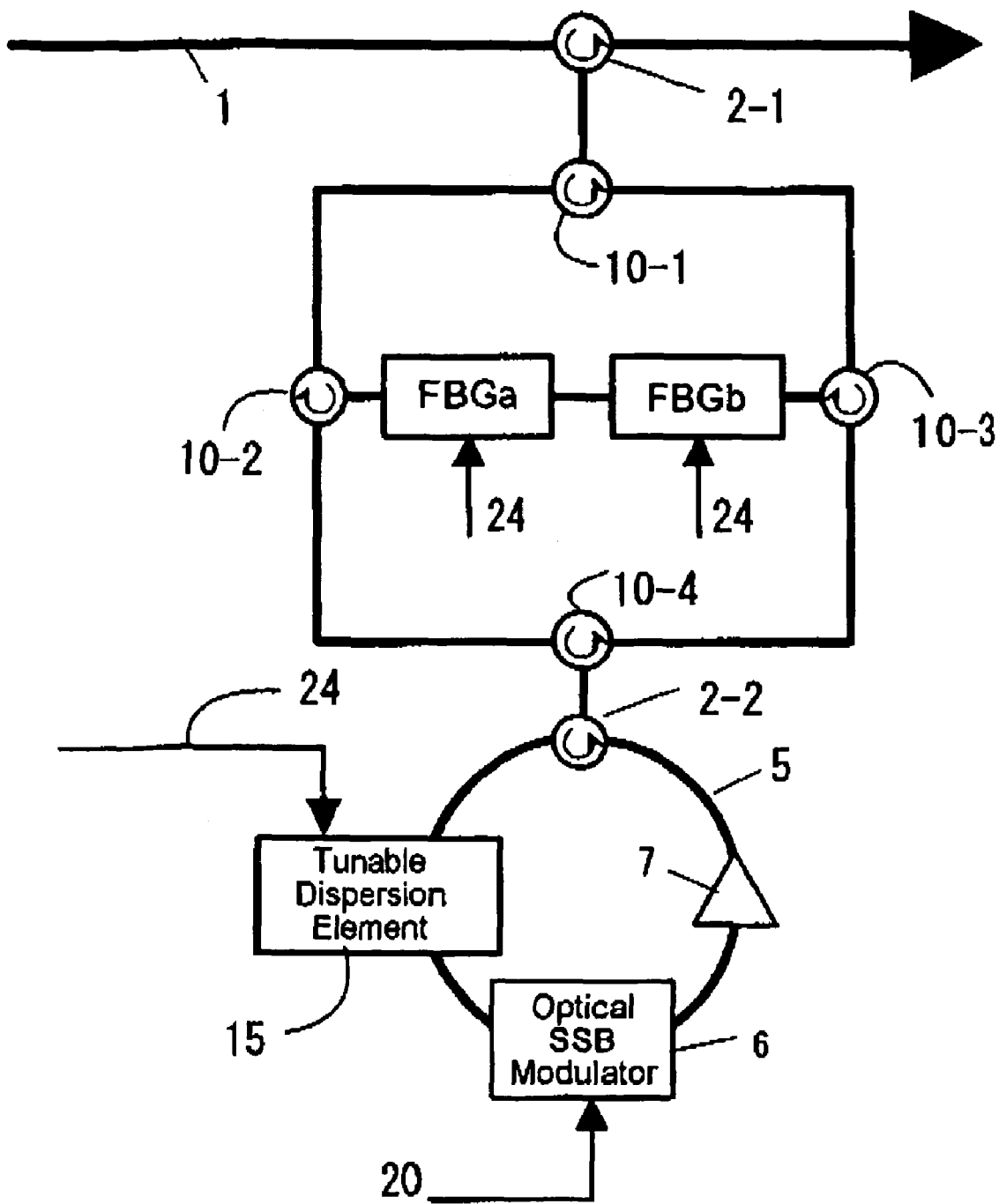
FIG. 8 illustrates an embodiment wherein the dispersion compensation block consists of an optical filter using a pair of FBGs.
Figure 9:
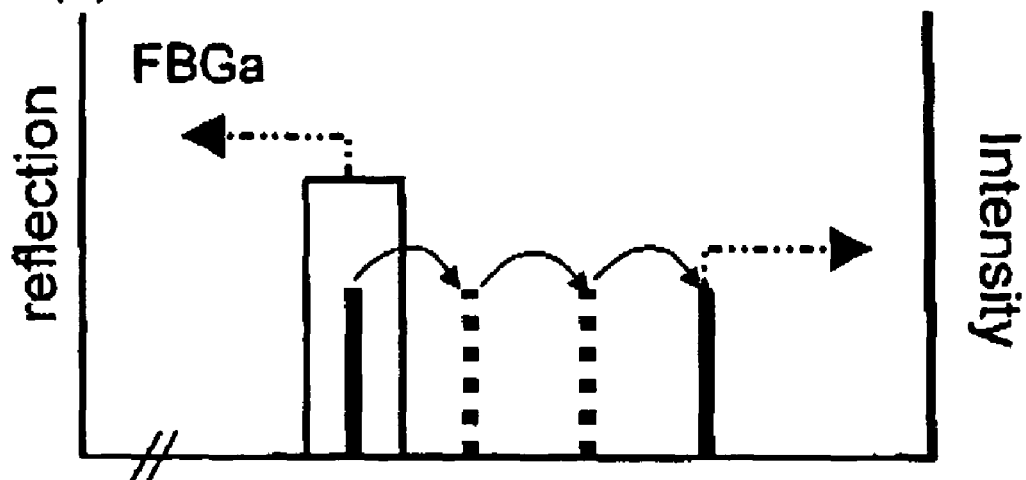
FIG. 9(a) illustrates the characteristics of a tunable light filter FBGa.
FIG. 9(b) illustrates the characteristics of a tunable light filter FBGb.
FIG. 9(c) illustrates the characteristics of a tunable light filter FBG.
Figure 9:
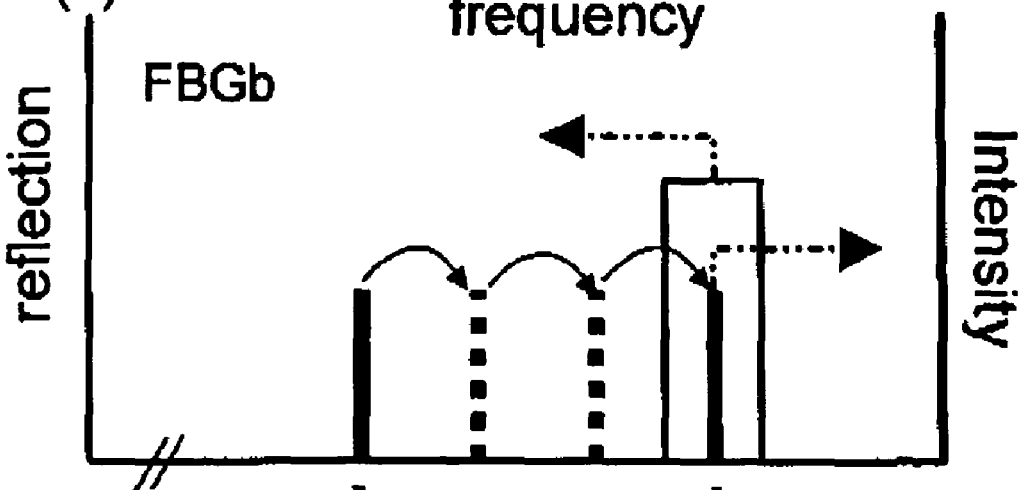
Figure 9:
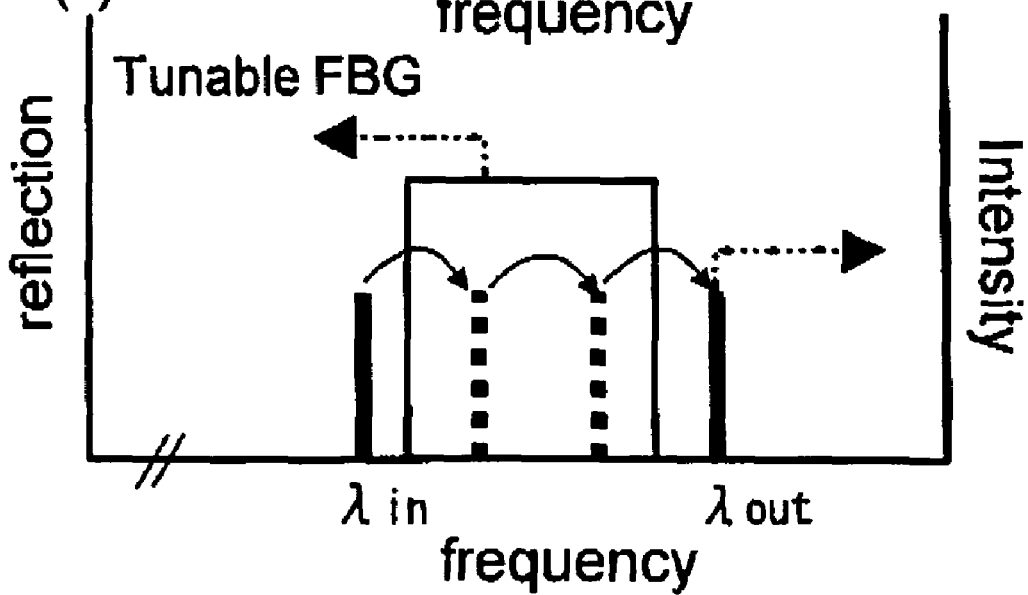

Embodiment 4 will be described. Embodiment 3 above is an example wherein the dispersion compensation block consists of an optical filter using a pair of FBGs having a narrow transmission band, but similar functionality can be achieved with an optical filter using a pair of FBGs having a narrow reflection band. The optical circuit shown in FIG. 8 is an example wherein the dispersion compensation block consists of an optical filter using a pair of FBGs having a narrow reflection band. As shown in FIG. 9(a), the characteristics of tunable filter FBGa are such that the input signal ($\lambda_{in}$) is reflected but all other signals are transmitted. In addition, as shown in FIG. 9(b), the characteristics of tunable filter FBGb are such that the output signal ($\lambda_{out}$) is reflected but all other signals are transmitted. In addition, as shown in FIG. 9(c), the characteristics of the tunable FBG are such that the frequency-shifted light between the input light and output light is reflected. By using such an optical filter to construct the optical circuit of FIG. 9, one essentially equivalent to the dispersion compensation block 101 or 201 can be obtained. In order to make the dispersion compensation block shown in the block diagram of FIG. 9 function like the dispersion compensation block of FIG. 1, the FBGa or FBGb is controlled by control signals 24. In this case, the tunable FBG 14 is not used. In addition, in order to make the constitution of FIG. 9 function like the dispersion compensation block of FIG. 2, the tunable FBG 14 rather than FBGa or FBGb is controlled by control signals 24.

Figure 10:
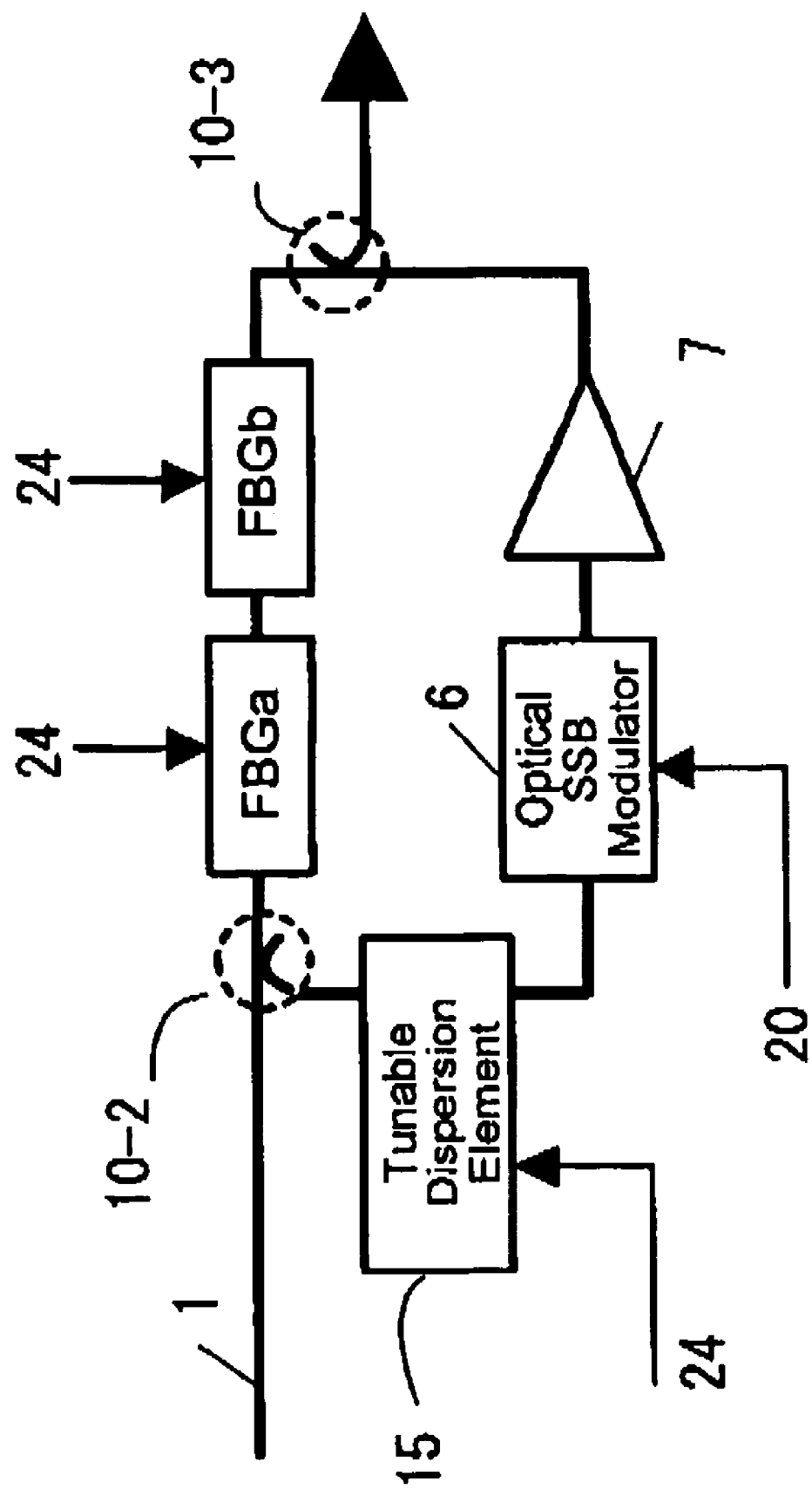
FIG. 10 illustrates a simplified embodiment of the optical circuit of FIG. 8.

However, in the constitution of FIG. 8, the use of circulators is redundant, so eliminating this redundancy gives the constitution of FIG. 10. In order to make this function like the constitution of FIG. 1, the FBGa or FBGb is controlled with control signals 24. In this case, the tunable FBG 14 is not used. In addition, in order to make the constitution of FIG. 7 function like the constitution of FIG. 2, the tunable FBG 14 rather than FBGa or FBGb is controlled by control signals 24.

With the tunable dispersion compensation apparatus according to the present invention, by compensating for wavelength dispersion in the transmission channel before transmitting an optical signal, or compensating after receiving a signal, the effects of the wavelength dispersion characteristics of the transmission channel can be suppressed and high-speed communications can be achieved. In the compensation of wavelength dispersion, optimal values for the amount of compensation are determined for each sending point and receiving point and collected in a database, so by using the optimal compensation values depending on the destination or origin, wavelength dispersion compensation can be performed easily, so a high communications speed can be maintained even if the sending point or receiving point changes.

What is claimed is:

1. A tunable dispersion compensation apparatus comprising:
a light path from an input block to an output block, the input block configured to input an optical signal to the light path, the output block configured to output the optical signal from the light path;
a circulating light path upon the light path;

a dispersion element that has wavelength dispersion characteristics;
a wavelength shifter configured to shift a wavelength of the optical signal on the circulating light path:
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the light path is provided with a first circulator and a second circulator; the circulating light path is a loop-shaped path connecting the second circulator and the wavelength shifter; the optical signal inputted to the light path from the input block passes through the first circulator and the dispersion element, circulates around the loop-shaped light path and passes through the dispersion element and the first circulator in the light path until reaching the output block; and the dispersion element has a reflection band intermediate between a wavelength of the inputted optical signal and a wavelength of the optical signal reaching the output block.

2. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation upon a received optical signal, based on information that accompanies the received optical signal, and
the light path is provided with a first circulator and a second circulator; the circulating light path is a loop-shaped path connecting the second circulator and the wavelength shifter; the optical signal inputted to the light path from the input block passes through the first circulator and the dispersion element, circulates around the loop-shaped light path and passes through the dispersion element and the first circulator in the light path until reaching the output block; and the dispersion element has a reflection band intermediate between a wavelength of the inputted optical signal and a wavelength of the optical signal reaching the output block.

3. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation in advance upon an optical signal to be sent, based on information related to destination of the optical signal to be sent, and
the light path is provided with a first circulator and a second circulator; the circulating light path is a loop-shaped path connecting the second circulator and the wavelength shifter; the optical signal inputted to the light path from the input block passes through the first circulator and the dispersion element, circulates around the loop-shaped light path and passes through the dispersion element and the first circulator in the light path until reaching the output block; and the dispersion element has a reflection band intermediate between a wavelength of the inputted optical signal and a wavelength of the optical signal reaching the output block.

4. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation upon a received optical signal, based on information that accompanies the received optical signal,
the controller is configured to control the number of times the inputted optical signal circulates around the circulating light path, the number being determined by adjusting the amount of shift of the wavelength shifter based on the information, and the light path is provided with a first circulator and a second circulator; the circulating light path is a loop-shaped path connecting the second circulator and the wavelength shifter; the optical signal inputted to the light path from the input block passes through the first circulator and the dispersion element, circulates around the loop-shaped light path and passes through the dispersion element and the first circulator in the light path until reaching the output block; and the dispersion element has a reflection band intermediate between a wavelength of the inputted optical signal and a wavelength of the optical signal reaching the output block.

5. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation in advance upon an optical signal to be sent, based on information related to destination of the optical signal to be sent,
the controller is configured to control the number of times the inputted optical signal circulates around the circulating light path, the number being determined by adjusting the amount of shift of the wavelength shifter based on the information, and
the light path is provided with a first circulator and a second circulator; the circulating light path is a loop-shaped path connecting the second circulator and the wavelength shifter; the optical signal inputted to the light path from the input block passes through the first circulator and the dispersion element, circulates around the loop-shaped light path and passes through the dispersion element and the first circulator in the light path until reaching the output block; and the dispersion element has a reflection band intermediate between a wavelength of the inputted optical signal and a wavelength of the optical signal reaching the output block.

6. A tunable dispersion compensation apparatus comprising:
a light path from an input block to an output block, the input block configued to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation upon a received optical signal, based on information that accompanies the received optical signal,
the dispersion characteristics of the dispersion element are externally tunable, and dispersion applied to the optical signal is controlled by adjusting the dispersion characteristics of the dispersion element, and
the light path is provided with a first circulator and a second circulator; the circulating light path is a loop-shaped path connecting the second circulator and the wavelength shifter; the optical signal inputted to the light path from the input block passes through the first circulator and the dispersion element, circulates around the loop-shaped light path and passes through the dispersion element and the first circulator in the light path until reaching the output block; and the dispersion element has a reflection band intermediate between a wavelength of the inputted optical signal and a wavelength of the optical signal reaching the output block.

7. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation in advance upon an optical signal to be sent, based on information related to destination of the optical signal to be sent,
the dispersion characteristics of the dispersion element are externally tunable, and dispersion applied to the optical signal is controlled by adjusting the dispersion characteristics of the dispersion element, and
the light path is provided with a first circulator and a second circulator; the circulating light path is a loop-shaped path connecting the second circulator and the wavelength shifter; the optical signal inputted to the light path from the input block passes through the first circulator and the dispersion element, circulates around the loop-shaped light path and passes through the dispersion element and the first circulator in the light path until reaching the output block; and the dispersion element has a reflection band intermediate between a wavelength of the inputted optical signal and a wavelength of the optical signal reaching the output block.

8. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the optical path is provided with a first circulator, a second circulator and a reflection element; the circulating light path is a loop-shaped path containing the second circulator, the wavelength shifter and the dispersion element; the optical signal inputted to the light path from the input block passes through the first circulator and the reflection element, circulates around the loop-shaped light path and passes through the reflection element and the first circulator in the light path until reaching the output block, and wherein the reflection element has a reflection band intermediate between a wavelength of the inputted optical signal and a wavelength of the optical signal reaching the output block.

9. A tunable dispersion compensation apparatus, comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation upon a received optical signal, based on information that accompanies the received optical signal, and the optical path is provided with a first circulator, a second circulator and a reflection element; the circulating light path is a loop-shaped path containing the second circulator, the wavelength shifter and the dispersion element; the optical signal inputted to the light path from the input block passes through the first circulator and the reflection element, circulates around the loop-shaped light path and passes through the reflection element and the first circulator in the light path until reaching the output block, and wherein the reflection element has a reflection band intermediate between a wavelength of the inputted optical signal and a wavelength of the optical signal reaching the output block.

10. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;
means for circulating the inputted optical signal around the circulating light path a stipulated number of times determined based on the amount of shift of the wavelength shifter controlled by the controller before the optical signal is output by the output means,
wherein the controller is configured to control the amount of shift of the wavelength shifter so that the apparatus performs dispersion compensation in advance upon an optical signal to be sent, based on information related to destination of the optical signal to be sent, and
the optical path is provided with a first circulator, a second circulator and a reflection element; the circulating light path is a loop-shaped path containing the second circulator, the wavelength shifter and the dispersion element; the optical signal inputted to the light path from the input block passes through the first circulator and the reflection element, circulates around the loop-shaped light path and passes through the reflection element and the first circulator in the light path until reaching the output block, and wherein the reflection element has a reflection band intermediate between a wavelength of the inputted optical signal and a wavelength of the optical signal reaching the output block.

11. A tunable dispersion compensation apparatus comprising:
a light path from an input block to an output block, the input block configured to input an optical signal to the light path, the output block configured to output the optical signal from the light path;
a circulating light path upon the light path;
a dispersion element that has wavelength dispersion characteristics;
a wavelength shifter configured to shift a wavelength of the optical signal on the circulating light path;
a controller configured to control an amount of shift of the wavelength shifter depending on the inputted optical signal or to control the dispersion characteristics of the dispersion element for providing a required dispersion value for a compensation;

means for circulating the inputted optical signal around the circulating light path a stipulated number of times determined based on the amount of shift of the wavelength shifter controlled by the controller before the optical signal is output by the output means, wherein the controller is configured to control the amount of shift of the wavelength shifter so that the apparatus performs dispersion compensation upon a received optical signal, based on information that accompanies the received optical signal, the controller is configured to control the number of times the inputted optical signal circulates around the circulating light path, the number being determined by adjusting the amount of shift of the wavelength shifter based on the information, and the optical path is provided with a first circulator, a second circulator and a reflection element; the circulating light path is a loop-shaped path containing the second circulator, the wavelength shifter and the dispersion element; the optical signal inputted to the light path from the input block passes through the first circulator and the reflection element, circulates around the loop-shaped light path and passes through the reflection element and the first circulator in the light path until reaching the output block, and wherein the reflection element has a reflection band intermediate between a wavelength of the inputted optical signal and a wavelength of the optical signal reaching the output block.

12. A tunable dispersion compensation apparatus comprising:

a light path from an input block to an output block, the input block configured to input an optical signal to the light path, the output block configured to output the optical signal from the light path;

a circulating light path upon the light path;

a dispersion element that has wavelength dispersion characteristics;

a wavelength shifter configured to shift a wavelength of the optical signal on the circulating light path;

a controller configured to control an amount of shift of the wavelength shifter depending on the inputted optical signal or to control the dispersion characteristics of the dispersion element for providing a required dispersion value for a compensation;

means for circulating the inputted optical signal around the circulating light path a stipulated number of times determined based on the amount of shift of the wavelength shifter controlled by the controller before the optical signal is output by the output means, wherein the controller is configured to control the amount of shift of the wavelength shifter so that the apparatus performs dispersion compensation in advance upon an optical signal to be sent, based on information related to destination of the optical signal to be sent, the controller is configured to control the number of times the inputted optical signal circulates around the circulating light path, the number being determined by adjusting the amount of shift of the wavelength shifter based on the information, and the optical path is provided with a first circulator, a second circulator and a reflection element; the circulating light path is a loop-shaped path containing the second circulator, the wavelength shifter and the dispersion element; the optical signal inputted to the light path from the input block passes through the first circulator and the reflection element, circulates around the loop-shaped light path and passes through the reflection element and the first circulator in the light path until reaching the output block, and wherein the reflection element has a reflection band intermediate between a wavelength of the inputted optical signal and a wavelength of the optical signal reaching the output block.

13. A tunable dispersion compensation apparatus comprising:

a light path from an input block to an output block, the input block configured to input an optical signal to the light path, the output block configured to output the optical signal from the light path;

a circulating light path upon the light path;

a dispersion element that has wavelength dispersion characteristics;

a wavelength shifter configured to shift a wavelength of the optical signal on the circulating light path;

a controller configured to control an amount of shift of the wavelength shifter depending on the inputted optical signal or to control the dispersion characteristics of the dispersion element for providing a required dispersion value for a compensation;

means for circulating the inputted optical signal around the circulating light path a stipulated number of times determined based on the amount of shift of the wavelength shifter controlled by the controller before the optical signal is output by the output means, wherein the controller is configured to control the amount of shift of the wavelength shifter so that the apparatus performs dispersion compensation upon a received optical signal, based on information that accompanies the received optical signal, the dispersion characteristics of the dispersion element are externally tunable, and dispersion applied to the optical signal is controlled by adjusting the dispersion characteristics of the dispersion element, and the optical path is provided with a first circulator, a second circulator and a reflection element; the circulating light path is a loop-shaped path containing the second circulator, the wavelength shifter and the dispersion element; the optical signal inputted to the light path from the input block passes through the first circulator and the reflection element, circulates around the loop-shaped light path and passes through the reflection element and the first circulator in the light path until reaching the output block, and wherein the reflection element has a reflection band intermediate between a wavelength of the inputted optical signal and a wavelength of the optical signal reaching the output block.

14. A tunable dispersion compensation apparatus comprising:

a light path from an input block to an output block, the input block configured to input an optical signal to the light path, the output block configured to output the optical signal from the light path;

a circulating light path upon the light path;

a dispersion element that has wavelength dispersion characteristics;

a wavelength shifter configured to shift a wavelength of the optical signal on the circulating light path;

a controller configured to control an amount of shift of the wavelength shifter depending on the inputted optical signal or to control the dispersion characteristics of the dispersion element for providing a required dispersion value for a compensation;

means for circulating the inputted optical signal around the circulating light path a stipulated number of times determined based on the amount of shift of the wavelength shifter controlled by the controller before the optical signal is output by the output means, wherein the controller is configured to control the amount of shift of the wavelength shifter so that the apparatus performs dispersion compensation in advance upon an optical signal to be sent, based on information related to destination of the optical signal to be sent, the dispersion characteristics of the dispersion element are externally tunable, and dispersion applied to the optical signal is controlled by adjusting the dispersion characteristics of the dispersion element, and the optical path is provided with a first circulator, a second circulator and a reflection element; the circulating light path is a loop-shaped path containing the second circulator, the wavelength shifter and the dispersion element; the optical signal inputted to the light path from the input block passes through the first circulator and the reflection element, circulates around the loop-shaped light path and passes through the reflection element and the first circulator in the light path until reaching the output block, and wherein the reflection element has a reflection band intermediate between a wavelength of the inputted optical signal and a wavelength of the optical signal reaching the output block.

15. A tunable dispersion compensation apparatus comprising:

a light path from an input block to an output block, the input block configured to input an optical signal to the light path, the output block configured to output the optical signal from the light path;

a circulating light path upon the light path;

a dispersion element that has wavelength dispersion characteristics;

a wavelength shifter configured to shift a wavelength of the optical signal on the circulating light path;

a controller configured to control an amount of shift of the wavelength shifter depending on the inputted optical signal or to control the dispersion characteristics of the dispersion element for providing a required dispersion value for a compensation;

means for circulating the inputted optical signal around the circulating light path a stipulated number of times determined based on the amount of shift of the wavelength shifter controlled by the controller before the optical signal is output by the output means, wherein the circulating light path is formed by an optical loop that connects a first filter, a first circulator, a second circulator and a second filter as a reflector and further connects the second circulator, the first circulator and the first filter as a reflector;

the first filter is configured to permit passage of the inputted optical signal and to reflect frequency-shifted light;

the second filter is configured to permit passage of optical signals that have reached the output block after having been frequency-shifted while circulating a predetermined number of times, and to reflect optical signals that have not circulated the predetermined number of times; and the optical signal that circulates around the circulating light path is given wavelength dispersion by the dispersion element and then output from the second filter.

16. A tunable dispersion compensation apparatus comprising:

a light path from an input block to an output block, the input block configured to input an optical signal to the light path, the output block configured to output the optical signal from the light path;

a circulating light path upon the light path;

a dispersion element that has wavelength dispersion characteristics;

a wavelength shifter configured to shift a wavelength of the optical signal on the circulating light path;

a controller configured to control an amount of shift of the wavelength shifter depending on the inputted optical signal or to control the dispersion characteristics of the dispersion element for providing a required dispersion value for a compensation;

means for circulating the inputted optical signal around the circulating light path a stipulated number of times determined based on the amount of shift of the wavelength shifter controlled by the controller before the optical signal is output by the output means, wherein the circulating light path is formed by an optical loop that connects a first circulator, a first filter, a first circulator, a second circulator and a second filter, where the inputted optical signal passes through the circulating light path before reaching the output block, the first filter is configured to reflect the inputted optical signal and transmit frequency-shifted light, the second filter is configured to reflect optical signals that have reached the output block after having been frequency-shifted while circulating a predetermined number of times, and to transmit optical signals that have not circulated the predetermined number of times, and the optical signal that circulates around the circulating light path are given wavelength dispersion by the dispersion element and then output from the second circulator.

* * * * *